(12) United States Patent
Chu et al.

(10) Patent No.: US 6,996,488 B2
(45) Date of Patent: Feb. 7, 2006

(54) SENSOR SIGNAL CONDITIONER

(75) Inventors: Charles Chu, Irvine, CA (US);
Michael Young, Irvine, CA (US)

(73) Assignee: Advanced Custom Sensors, Inc., Irvine, CA (US)

( * ) Notice: Subject to any disclaimer, the term of this patent is extended or adjusted under 35 U.S.C. 154(b) by 448 days.

(21) Appl. No.: 10/271,663

(22) Filed: Oct. 15, 2002

(65) Prior Publication Data
US 2004/0070495 A1    Apr. 15, 2004

(51) Int. Cl.
*G06F 19/00* (2006.01)
(52) U.S. Cl. ..................................... 702/107; 341/120
(58) Field of Classification Search ................ 702/107, 702/100, 104, 85, 87; 341/120, 143, 155
See application file for complete search history.

(56) References Cited

U.S. PATENT DOCUMENTS

| 4,080,658 | A | 3/1978 | Scott et al. |
|---|---|---|---|
| 4,084,248 | A | 4/1978 | Scott |
| 4,335,371 | A | 6/1982 | Connolly, Jr. et al. |
| 4,414,638 | A | 11/1983 | Talambiras |
| 4,588,308 | A | 5/1986 | Saito |
| 4,812,747 | A | 3/1989 | Gale et al. |
| 4,873,655 | A | 10/1989 | Kondraske |
| 4,912,397 | A | 3/1990 | Gale |
| 5,089,979 | A | 2/1992 | McEachern et al. |
| 5,479,096 | A | 12/1995 | Szczvrbak et al. |
| 5,995,033 | A | 11/1999 | Roeckner et al. |
| 6,032,109 | A | 2/2000 | Ritmiller, III |
| 6,084,394 | A | 7/2000 | Windsheimer et al. |
| 6,839,013 | B1 * | 1/2005 | Cummins et al. ........... 341/155 |

* cited by examiner

Primary Examiner—Marc S. Hoff
Assistant Examiner—Edward Raymond

(57) ABSTRACT

A sensor signal conditioner for temperature compensating, linearizing, and amplifying sensor signal output in electronic instrumentation circuits includes a programmable gain instrument amplifier having an input connected to a sensor; and a comparator for comparing an output voltage of the amplifier to a desired output voltage value. A micro-controller controls the instrument amplifier gain and offset. A mode switch converts an I/O pin to input the desired output voltage value in programming mode and connects the I/O pin to the amplifier output in user mode. A memory stores a programming protocol in the sensor signal conditioner so that in programming mode, the protocol stores programmed values and linearly fits the programmed values to set trim values for temperature compensating, linearizing, and amplifying the instrument amplifier output. The I/O pins and mode switches of several sensor signal conditioners can be controlled simultaneously to mass produce transducers using the sensor signal conditioner.

28 Claims, 3 Drawing Sheets

SENSOR SIGNAL CONDITIONER

BACKGROUND OF THE INVENTION

The present invention generally relates to sensors for electronic instrumentation and, more particularly, to temperature compensation, linearization, and amplification of the output signal of a transducer.

Transducers are used in a wide variety of engineering applications to convert various physical quantities to an electrical signal. An example of one type of such a transducer is the pressure transducer, which usually includes a pressure sensor and some associated circuitry for producing an electrical output. Pressure transducers may be used for applications as varied as sensing oil pressure in an engine to sensing cabin air pressure in an aircraft. A pressure transducer typically provides an output voltage or current that is a function of pressure applied to the sensor. For example, the output voltage or current may be some specific value at zero pressure and may increase in proportion to the increase in pressure on the sensor. In such a case, the transducer output signal voltage or current is a linear function of the input pressure, and the transducer output signal is said to be linear. Although linearity of the transducer output signal is desirable, it is typically not the case. For most sensors, the specific values of output voltage or current at zero pressure and full-scale pressure will also change with temperature.

Sensors are generally coupled in transducers through at least a rudimentary signal conditioning circuit to electronic instrumentation for use in an application. The conditioning circuit is typically an analog circuit, as opposed to a digital circuit. Due to imperfections in sensor element manufacturing, the sensor signal conditioner must be able to compensate the transducer output signal for the span and offset of the sensor output over the operating temperature range. For example, in the case of the pressure sensor output voltage or current, the sensor signal conditioner must be able to adjust the span—the range of voltage or current output between the highest and lowest output voltage or current—and must also be able to adjust the offset—the particular output voltage or current for a certain value of pressure at the sensor, usually zero or equilibrium pressure. The span and offset adjustments for a conventional analog sensor signal conditioner are usually adjusted using a set of trim pots, or potentiometers, to set trim values, which may be, for example, voltages. In addition to imperfections in sensor element manufacturing, the conditioning circuit itself may contribute to non-linearity of the transducer output signal. Temperature, both ambient temperature and temperature changes caused by power dissipation in the circuit and sensor, may also affect the transducer output signal.

Currently, temperature compensation is performed using either an analog or digital approach. An analog approach adds resistors and thermistors (Positive Temperature Coefficient (PTC) or Negative Temperature Coefficient (NTC)). The analog approach is not very accurate, however, due to the repeatability of thermistors and limited selection in resistor values. Also, the analog approach is very time consuming since it requires several iterations in resistor installation and temperature test. Only linear or second order compensation is feasible in this approach.

With the development of integrated circuits, circuits for sensor signal conditioning have been developed using features such as analog-to-digital conversion and non-volatile memory look-up tables. Digital sensor signal conditioner circuits allow greater flexibility in transducer design and increase transducer accuracy and usability. Digital sensor signal conditioner circuits may take advantage of computer controlled instruments and digital communication with a computer by using a procedure to set certain parameters, such as the trim values described above, in order to provide temperature compensation, linearization, and amplification for the sensor.

Prior art procedures for setting trim values typically start by sending an estimated trim value to the sensor signal conditioner circuit, which may be implemented, for example, in an integrated circuit (IC) chip, such as an application specific integrated circuit (ASIC). The estimated trim value is used with a test input value applied to the transducer at a controlled temperature to produce a readout on a computer controlled instrument. In the pressure sensor example, a test pressure would be applied to the sensor with the sensor at a known temperature, and the readout on a computer-controlled instrument would be checked against a desired value. Based on the readout, the estimated trim value is adjusted and the process is repeated until the readout from the computer controlled instrument falls within a predetermined error limit. Then the same repetitive procedure is done on multiple sensing and multiple temperature ranges. For example, using the pressure sensor, the repetitive procedure would be done at a number of different pressure and temperature combinations.

Continuing to use the pressure sensor as an example, the pressure reading can be derived from the sensor output using following equations:

$$Vout = Z(T) + S(T) * P$$
$$= (A_0 + A_1 * T + A_2 * T^2 + \cdots) + (B_0 + B_1 * T + B_2 * T^2 + \cdots) * P$$
$$= C_0 + C_1 * P + C_2 * P^2 + \cdots$$

where P=pressure in psi;

T=temperature in ° C. or ° F.;

Vout=sensor output, typically measured in milliVolts (mV);

Z(T)=zero offset of sensor, which is a function of temperature;

S(T)=sensitivity of sensor, which is a function of temperature; and $A_i$, $B_i$, $C_i$=curve-fit coefficients (constants).

Temperature compensation is accomplished through the $A_i$ and $B_i$ coefficients, where the $A_i$ coefficients are used for zero offset and the $B_i$ coefficients are used for the sensitivity. Correction for non-linearity is accomplished through the $C_i$ coefficients.

For example, a second order linearity correction requires solving the following equation:

$$Vout = C_0 + C_1 * P + C_2 * P^2.$$

In general a non-linear equation, such as the above, can be approximated using either a polynomial fit or a piecewise-linear fit.

For example, a second order polynomial fit requires measuring sensor output, $V_{outi}$, at three different pressure inputs, $P_1$, $P_2$, and $P_3$, and substituting the values into the following equations:

$$V_{out1}=C_0+C_1*P_1+C_2*P_1^2$$

$$V_{out2}=C_0+C_1*P_2+C_2*P_2^2$$

$$V_{out3}=C_0+C_1*P_3+C_2*P_3^2$$

The $C_i$ coefficients can be calculated by solving these three equations simultaneously.

The solution can also be approximated by two straight lines using a piecewise-linear fit. Using a piecewise-linear fit also requires measuring sensor output, $V_{out}$, at three different pressure inputs, $P_1$, $P_2$, and $P_3$. Vout can then be approximated using the following equations:

$$V_{out}=D_0+D_1*P \text{ when } P_1<P<P_2$$

$$V_{out}=E_0+E_1*P \text{ when } P_2<P<P_3$$

where the $D_i$ and $E_i$ coefficients can be calculated by substituting the values for $V_{out}$ and $P_1$, $P_2$, and $P_3$ and then solving each of the two linear equations. The calculation is much simpler than the calculation for a polynomial fit.

For second order temperature compensation, a polynomial fit may be performed by solving the following equations in a manner similar to that described above. Measurements are made at six temperatures, $T_1$ through $T_6$.

$$V_{out1}=(A_0+A_1*T_1+A_2*T_1^2)+(B_0+B_1*T_1+B_2*T_1^2)*P$$

$$V_{out2}=(A_0+A_1*T_2+A_2*T_2^2)+(B_0+B_1*T_2+B_2*T_2^2)*P$$

$$V_{out3}=(A_0+A_1*T_3+A_2*T_3^2)+(B_0+B_1*T_3+B_2*T_3^2)*P$$

$$V_{out4}=(A_0+A_1*T_4+A_2*T_4^2)+(B_0+B_1*T_4+B_2*T_4^2)*P$$

$$V_{out5}=(A_0+A_1*T_5+A_2*T_5^2)+(B_0+B_1*T_5+B_2*T_5^2)*P$$

$$V_{out6}=(A_0+A_1*T_6+A_2*T_6^2)+(B_0+B_1*T_6+B_2*T_6^2)*P$$

A piecewise-linear fit may be performed by solving the following equations in a manner similar to that described above. Measurements are made at three temperatures, $T_1$ through $T_3$.

$$V_{out}=(F_0+F_1*T)+(G_0+G_1*T)*P \text{ when } T_1<T<T_2$$

$$V_{out}=(H_0+H_1*T)+(I_0+I_1*T)*P \text{ when } T_2<T<T_3$$

The $A_i$ and $B_i$ coefficients can be derived by simultaneously solving the polynomial equations or the $F_i$, $G_i$, $H_i$, and $I_i$ coefficients can be derived by simultaneously solving the two linear equations in a manner similar to that described above.

Companies that design and market digital signal conditioning IC chips use the above approach almost exclusively. The calculations are very extensive and typically require either a computer or a special calibration set up in order to perform the task of setting up and calibrating the IC chip. The calibration set up is very expensive since, for example, it may have to accommodate two-way digital communication between the IC chip and a computer and, also, analog data transmission of multiple sensors.

Prior art procedures, such as that just described, to provide temperature compensation, linearization, and amplification of the output of a transducer using an ASIC may be implemented using a computer. For example, a computer is connected to the ASIC chip using a data communication protocol, such as RS-232. The computer trims the transducer output until the desired output signal is achieved. The computer then sends an adjusted value to the ASIC chip. The ASIC chip takes the adjusted value from the computer, and a digital-to-analog (D/A) circuit converts the adjusted value to alter the output signal. The output is then measured by a digital multi-meter (DMM) and the measured output value is sent to the computer. The computer then makes a further decision on whether the adjusted value is too little or too much. The process is cyclic and can last for a few minutes. Once the computer decides that the adjusted value is close enough, the adjusted value is "burned" in to the EPROM or EEPROM on board the ASIC. This procedure is repeated for a number of different pressure and temperature combinations.

Despite the advantages of using ASIC chips for temperature compensation, linearization and amplification of transducer output, including better sensing accuracy, the current practice does not take full advantage of the cost-saving features of the digital approach because of the extensive hardware and software setup involved in adjusting the output and setting trim values as described above. For example, because every particular combination of sensor and ASIC integrated circuit chip is slightly different, individual trimming of each individual combination of sensor and ASIC conditioning circuit is required during mass production of transducers, i.e., the combination of sensor and ASIC conditioning circuit. In order to achieve individual trimming of each transducer, some form of individual communication is typically setup between a computer, or other means of controlling the trimming process, and each transducer. For example, a computer could assign a different "address" to each individual transducer as part of a communication protocol between the computer and all the transducers. Such communication setup may be complicated and time-consuming, adversely affecting some of the advantages of mass production, such as time and cost efficiency.

As can be seen, there is a need for setting trim values to provide temperature compensation, linearization, and amplification of the output of a transducer, which avoids extensive hardware and software setup. Also, there is a need for setting trim values to provide temperature compensation, linearization, and amplification of the output of a transducer, which can be performed simultaneously on many transducers despite differences between individual components.

SUMMARY OF THE INVENTION

The present invention provides temperature compensation, linearization and amplification of the output of a transducer for which setting trim values avoids extensive hardware and software setup. The present invention also provides trim value set up to temperature compensate, linearize and amplify the output of transducers, which can be performed simultaneously on many transducers despite differences between individual components.

In one aspect of the present invention, a system includes a programmable gain instrument amplifier having an input connected to a sensor; a comparator for comparing an amplifier output voltage of the programmable gain instrument amplifier to a desired output voltage value and providing a difference; a micro-controller for providing a gain and an offset based on the difference; a digital-to-analog converter for providing the gain to the programmable gain instrument amplifier; a digital-to-analog converter for providing the offset to the programmable gain instrument amplifier; and a memory for storing a programming protocol whereby trim values for temperature compensating and linearizing an amplifier output of the programmable gain instrument amplifier may be set and stored.

In another aspect of the present invention, an electronic instrumentation circuit for temperature compensating, linearizing, and amplifying a transducer signal output includes a programmable gain instrument amplifier having an input connected to a sensor; a comparator for comparing an amplifier output voltage of the programmable gain instrument amplifier to a desired output voltage value and providing a difference; a micro-controller for providing a gain and an offset based on the difference; a digital-to-analog converter for providing the gain to the programmable gain instrument amplifier; a digital-to-analog converter for providing the offset to the programmable gain instrument amplifier; an I/O pin; a mode switch for connecting the I/O pin to an input of the comparator for inputting the desired output voltage value in a programming mode and for connecting the I/O pin to the amplifier output in a user mode; a user/programming mode pin for controlling the mode switch; and a memory for storing a programming protocol whereby, in the programming mode, the programming protocol is performed to store a plurality of programmed values and linearly fit the programmed values to set trim values for temperature compensating and linearizing an amplifier output of the programmable gain instrument amplifier.

In still another aspect of the present invention, a mass-produced, temperature compensated and linearized transducer includes a programmable gain instrument amplifier having an input connected to a sensor; a comparator for comparing an amplifier output voltage of the programmable gain instrument amplifier to a desired output voltage value and providing a difference; a micro-controller for providing a gain and an offset based on the difference; a digital-to-analog converter for providing the gain to the programmable gain instrument amplifier; a digital-to-analog converter for providing the offset to the programmable gain instrument amplifier; an I/O pin for providing connection to a voltage generator simultaneously with a second transducer; a mode switch for connecting the I/O pin to an input of the comparator for inputting the desired output voltage value in a programming mode and for connecting the I/O pin to the amplifier output in a user mode; a user/programming mode pin for controlling the mode switch; a memory for storing a programming protocol; and a step indicator for indicating the currently processed step of the programming protocol whereby, in the programming mode, the programming protocol is performed while the second transducer is connected at the I/O pin and the programming protocol is performed to store a plurality of programmed values and linearly fit the programmed values to set trim values for temperature compensating and linearizing an amplifier output of the programmable gain instrument amplifier.

In yet another aspect of the present invention, an electronic instrumentation circuit for temperature compensating, linearizing, and amplifying a transducer signal output comprises a programmable gain instrument amplifier having an input connected to a sensor; a comparator for comparing an amplifier output voltage of the programmable gain instrument amplifier to a desired output voltage value and providing a difference; a micro-controller for providing a gain and an offset based on the difference; a temperature sensor for measuring a temperature of the sensor; an analog-to-digital converter for providing a temperature input from the temperature sensor to the micro-controller; an analog-to-digital converter for providing a digital value of the amplifier output voltage to the micro-controller; a digital-to-analog converter for providing the gain to the programmable gain instrument amplifier; a digital-to-analog converter for providing the offset to the programmable gain instrument amplifier; a high resolution digital-to-analog converter for providing a fine gain to the programmable gain instrument amplifier; a high resolution digital-to-analog converter for providing a fine offset to the programmable gain instrument amplifier; an I/O pin; a mode switch for connecting the I/O pin to an input of the comparator for inputting the desired output voltage value in a programming mode and for connecting the I/O pin to the amplifier output in a user mode; a user/programming mode pin for controlling the mode switch; a program set pin; a memory for storing a programming protocol wherein the memory is an EPROM, the EPROM being programmable within five seconds after a high voltage is applied to the program set pin; and a step indicator for indicating the currently processed step of the programming protocol whereby, in the programming mode, the programming protocol is performed to store a plurality of programmed values and linearly fit the programmed values to set trim values for temperature compensating and linearizing an amplifier output of the programmable gain instrument amplifier.

In a further aspect of the present invention, a method for temperature compensating, linearizing, and amplifying transducer signal output includes steps of: applying an appropriate signal for a sensor signal conditioner to enter a programming mode; connecting a programmable, precision voltage source to the sensor signal conditioner; setting a temperature for a sensor connected to the sensor signal conditioner; taking at least three different physical measurements from the sensor at the temperature; storing a plurality of programmed values into a memory in the sensor signal conditioner; linearly fitting the plurality of programmed values in the signal sensor conditioner; repeating the setting, taking, storing, and linearly fitting steps for at least a second different temperature; and applying an appropriate signal for the sensor signal conditioner to enter a user mode.

These and other features, aspects and advantages of the present invention will become better understood with reference to the following drawings, description and claims.

DETAILED DESCRIPTION OF THE INVENTION

Figure 1:
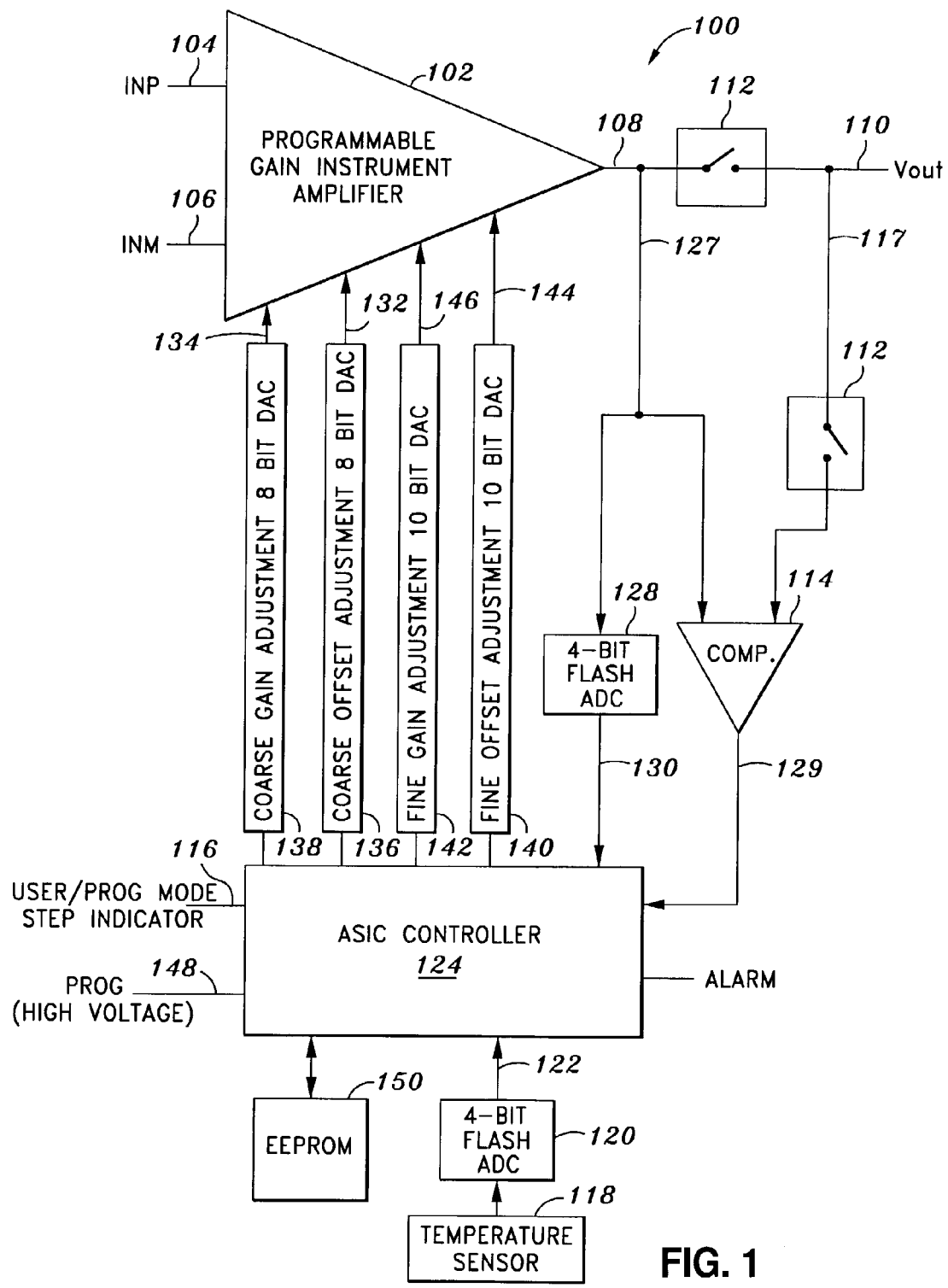
FIG. 1 is a system block diagram of a sensor signal conditioner for temperature compensation, linearization, and amplification of the output of electronic sensors, according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides temperature compensation, linearization, and amplification of the output of a sensor for electronic instrumentation for which setting trim values for the temperature compensation, linearization, and amplification circuit can be performed without extensive hardware and software setup. The present invention also provides a signal conditioning circuit for temperature compensation, linearization, and amplification of the signal output of sensors or transducers in which, in contrast to the prior art, certain aspects of the decision making for trim value set up can be taken over by the signal conditioning circuit itself, rather than be performed externally by a controller, for example, or computer. Thus, in an embodiment implemented on an application specific integrated circuit (ASIC) chip, for example, the present invention can be ideally suited for mass production, for example, simultaneous production in batches of ten to one hundred or more, of pre-trimmed transducers.

Mass production of transducers, i.e., the combination of sensor and ASIC signal conditioning circuit, may require individual trimming of each individual combination of sensor and ASIC signal conditioning circuit because every particular combination of sensor and ASIC integrated circuit chip is slightly different. In the prior art, some form of individual communication is typically setup between a computer, or other means of controlling the trimming process, and each transducer in order to achieve individual trimming of each transducer. For example, a computer could assign a different "address" to each individual transducer as part of a communication protocol between the computer and all the transducers. Such communication and software setup may be complicated and time-consuming, adversely affecting some of the advantages of mass production, such as time and cost efficiency. By moving certain aspects of the trimming operation to the sensor conditioning circuit on the ASIC chip, use of a computer, for example, can be avoided as well as the extensive hardware and software setup involved in prior art temperature compensating, linearizing and amplifying of sensor output and setting of trim values. The simplified setup of one embodiment can be used to efficiently mass produce individually pre-trimmed transducers, for example, in batches of ten to one hundred or more, and can save as much as a third or more of the cost of each transducer by eliminating the costly setup time from the manufacturing process.

In one embodiment implemented in an ASIC, the ASIC may adjust its internal digital-to-analog converters (DAC) to match a desired output voltage that is injected into the ASIC from an external precision power supply. The ASIC then programs the DAC adjustment setting into an erasable electronically programmable read only memory (EEPROM). This step can be repeated for different temperatures and pressures. Using the ASIC according to one embodiment, a precision power supply is the major piece of test equipment needed—the need for a computer being eliminated—for setting up and calibrating signal conditioning for sensors. There is no expensive calibration setup, programming, calculation, and data communication required for sensor calibration. This greatly reduces the production time and cost.

Referring now to FIG. 1, a circuit for temperature compensating, linearizing, and amplifying transducer signal output, embodied by sensor signal conditioner 100, is shown according to one embodiment. Sensor signal conditioner 100 may be implemented, for example, on an ASIC chip. Sensor signal conditioner 100 includes a programmable gain instrument amplifier 102, which may be a differential amplifier with a plus input 104, a minus input 106, and output 108. Either of plus input 104 and minus input 106 may be connected to the output of a sensor. Amplifier output 108 may be connected to input/output (I/O) pin 110 by switch 112. Switch 112 may be implemented, for example, as a pair of single pole single throw (SPST) switches, as shown in FIG. 1, or equivalently as a single pole double throw (SPDT) switch for connecting I/O pin 110 either to amplifier output 108 or to comparator 114.

Sensor signal conditioner 100 has a user mode for normal operation and a programming mode for setup and calibration. The choice of mode may be controlled from user/programming mode pin 116 by applying an appropriate signal or voltage. In response to a user mode signal at user/programming mode pin 116, switch 112 may be toggled to connect amplifier output 108 to I/O pin 110 and disconnect comparator 114 from I/O pin 110. This converts I/O pin 110 to an output pin for user mode and normal operation. In response to a programming mode signal at user/programming mode pin 116, switch 112 may be toggled to disconnect amplifier output 108 from I/O pin 110 and connect comparator 114 to I/O pin 110. This converts I/O pin 110 to an input pin for programming mode and setting trim values.

In programming mode, a desired output voltage value 117 may be fed to I/O pin 110, through switch 112 to comparator 114, while a test input may be applied to instrument amplifier 102. Using a pressure sensor as an illustrative example, a specific test pressure would be applied to the pressure sensor at a specific test temperature. The pressure sensor could produce a corresponding voltage at the plus input 104 or minus input 106 of instrument amplifier 102. Temperature may be measured by a temperature sensor 118 connected to an analog-to-digital converter (ADC) 120 for providing temperature input 122 to micro-controller 124.

From the test input, instrument amplifier 102 may generate amplifier output signal 127. Amplifier output signal 127 may be fed to comparator 114 and to ADC 128. Comparator 114 can compare desired output voltage value 117 to amplifier output voltage signal 127 and provide a signal representing the difference 129 as input to micro-controller 124. ADC 128 may provide the value of amplifier output voltage signal 127 as input to micro-controller 124. Thus, micro-controller 124 may receive as inputs both the digital value 130 of amplifier output voltage signal 127 and the difference 129 of amplifier output voltage 127 from the desired output voltage value 117.

Micro-controller 124 may progressively increase or decrease the offset 132 and gain 134 values of instrument amplifier 102 through low resolution digital-to-analog converters (DACS) 136 and 138, respectively, until amplifier output voltage 127 matches the desired output voltage value 117 or, equivalently, difference 129 output from comparator 114 is zero, within the resolution of the DACs. Sensor signal conditioner 100 may also include high-resolution digital-to-analog converters 140 and 142. Micro-controller 124 may progressively increase or decrease the fine offset 144 and fine gain 146 values of instrument amplifier 102 through high resolution digital-to-analog converters 140 and 142, respectively, until amplifier output signal 127 more precisely matches the desired output voltage value 117 or, equivalently, difference 129 output from comparator 114 is zero, within the smaller resolution of the high resolution DACs.

Program set pin 148 may provide high voltage for the programming of electronically programmable read only memory (EPROM) 150. EPROM 150 may also be implemented as an erasable EPROM, or EEPROM, as an example. The high voltage on program set pin 148 may signal EPROM 150 to remember the particular values of the DACs 136 and 138, and if provided, DACs 140 and 142, when amplifier output signal 127 is stable, i.e., matches the desired output voltage value 117, for more than 5 seconds.

A step indicator, which may be, for example, a current pulse, is then sent to user/programming mode pin 116, which may be connected to a display, for example, a simple light emitting diode (LED) counter display, to indicate which step the programming process has performed.

Once programming is completed, sensor signal conditioner 100 may be set to user mode for normal operation by applying an appropriate signal or voltage to user/programming mode pin 116.

Figure 2:
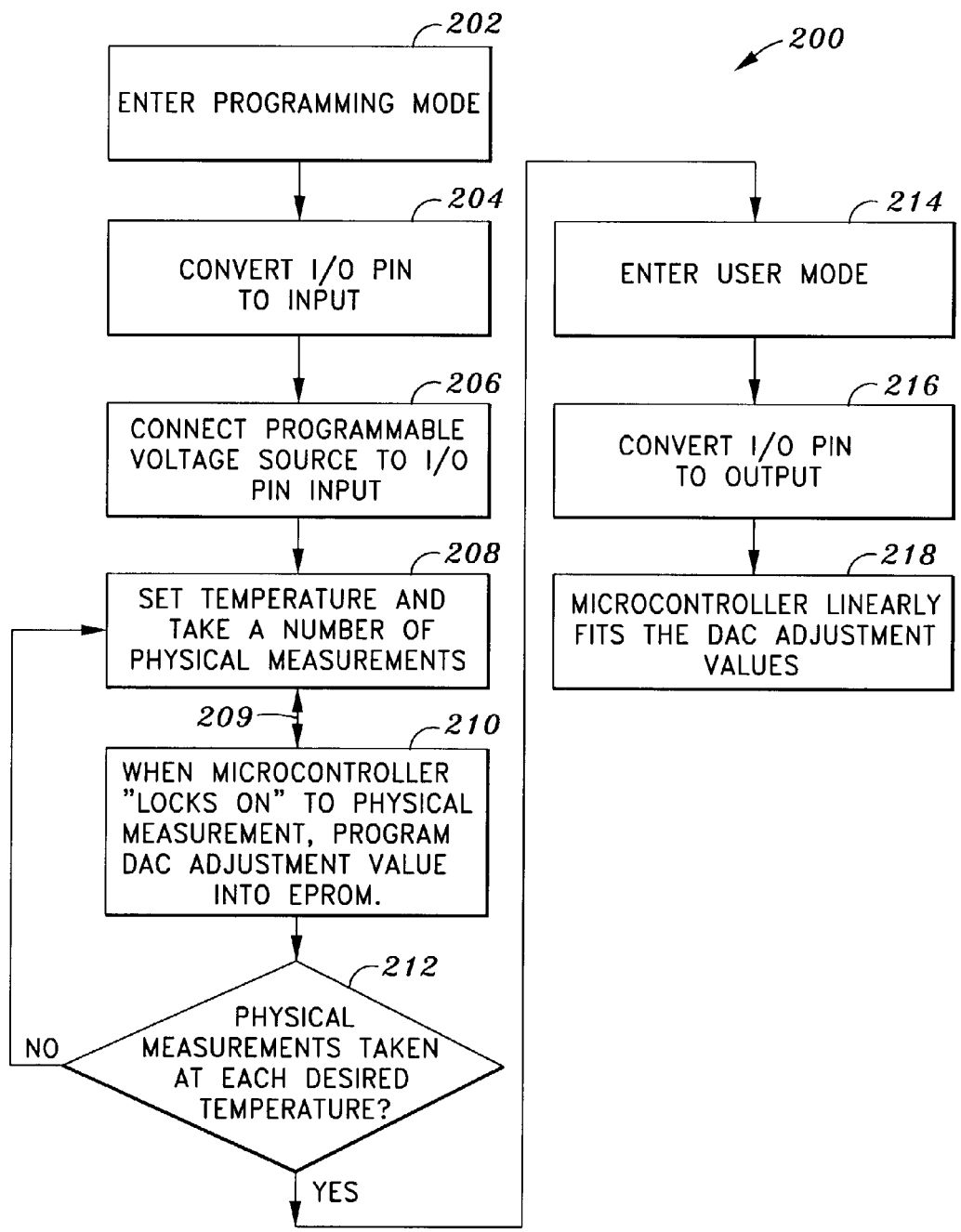
FIG. 2 is a flow chart illustrating one example of a procedure for setting trim values for temperature compensation, linearization, and amplification of the output of electronic sensors using a sensor signal conditioner, according to one embodiment of the present invention.

Referring now to FIG. 2, one example of a procedure 200 for setting trim values for temperature compensation, linearization, and amplification of the output of electronic sensors using a sensor signal conditioner is shown according to one embodiment. In the example used to illustrate procedure 200, reference is made to sensor signal conditioner 100, shown in FIG. 1, for the purpose of illustration. The programming protocol, which is followed on a step-by-step basis, of procedure 200 may be embedded within the firmware, for example, EPROM 150, of sensor signal conditioner 100. Sensor signal conditioner 100 enters programming mode, corresponding to step 202 of procedure 200, when an appropriate signal or voltage is applied to user/programming mode pin 116, for example, user/programming mode pin 116 may be pulled high. Once sensor signal conditioner 100 enters the programming mode, I/O pin 110 is converted, at step 204 of procedure 200, from an output pin to an input pin. A programmable, precision voltage source may be connected, at step 206 of procedure 200, to I/O pin 110, and control of procedure 200 passes to step 208.

At step 208 of procedure 200, the programmable, precision voltage source generates a desired voltage, for example, desired output voltage value 117, applied at I/O pin 110 for each test sensor measurement at each specific temperature. In the example used to illustrate procedure 200, sensor measurements may be taken at three or more different temperatures. At each specific temperature, at least three different physical measurements may be made using the sensor. Using the pressure sensor illustrative example, three different test pressures would be applied to the pressure sensor at each specific temperature. As each physical measurement is taken, control may pass to step 210 and then back to step 208 until three or more physical measurements have been taken at each specific desired temperature, as indicated by double arrow 209, seen in FIG. 2.

At step 210 of procedure 200, each time when the micro-controller has "locked" on to the desired voltage value, i.e., when amplifier output signal 127 is stable, matching the desired output voltage value 117, for more than 5 seconds, a high voltage may be supplied to high voltage program set pin 148 to program the DAC adjustment values into EPROM 150. Using a high voltage to program the EPROM eliminates the need for a charge pumping circuit and offers data security when the ASIC chip containing sensor signal conditioner 100 is in regular use. Programming of the DAC adjustment values into EPROM 150 can only occur 5 seconds after the high voltage is present at program set pin 148, giving time for micro-controller 124 to stabilize the digital-to-analog converters, for example DACs 136 and 138. The 8-bit temperature information, for example, temperature input 122 provided by ADC 120 connected to temperature sensor 118, may be stored at the same time.

After each step of the programming protocol, a step indicator current pulse may be generated at the user/programming mode pin 116 without pulling the input voltage at user/programming mode pin 116 below half of Vdd, i.e., the supply voltage to the ASIC chip. The step indicator current pulse indicates which step of the programming protocol the chip has performed so that a simple LED readout connected to user/programming mode pin 116 may be used to display the step of the programming protocol that is currently being performed by the ASIC chip. By using a step indicator readout, parallel programming can easily be achieved because program set pin 148 and the I/O pin 110 are common to all the ASIC chips that are to be programmed in parallel, so that common test and signal voltages can be applied simultaneously to all of the sensor signal conditioners being programmed. Thus, using the present invention, sensors can be mass-produced without extensive computer setup.

Because three different readings may be needed for each temperature, control can be passed back to step 208 of procedure 200 until three physical measurements have been made at each temperature and the corresponding DAC adjustment values have been stored, as indicated by double arrow 209, seen in FIG. 2. After three physical measurements have been taken for a specific temperature, control may pass to step 212 of procedure 200.

At step 212 of procedure 200, if three physical measurements have been taken for each of three different desired temperatures, then the programming mode may be exited by passing control to step 214 of procedure 200. If all of the desired temperatures have not yet been tested, control may be passed back to step 208 of procedure 200 with a new temperature set for testing the sensor. Although three temperatures have been used to illustrate an embodiment of procedure 200, a greater or lesser number of temperatures could be used depending, for example, on the type of sensor being used and the desired precision of sensor signal output temperature compensation, linearization, and amplification to be achieved.

At step 214 of procedure 200, sensor signal conditioner 100 may exit programming mode and enter user mode prior to normal operation of the sensor and sensor signal conditioner 100. The programmable, precision voltage source may be disconnected from I/O pin 110, at step 214 of procedure 200, and control of procedure 200 may pass to step 216. At step 216 of procedure 200, once sensor signal conditioner 100 has entered the user mode, I/O pin 110 may be converted from an input pin to an output pin when an appropriate signal or voltage is applied to user/programming mode pin 116, for example, user/programming mode pin 116 may be pulled low.

At step 218 of procedure 200, in user mode, the programmed DAC adjustment values corresponding to each of the physical measurements taken at each temperature may be linearly fitted by the simple micro-controller to produce a trim value for each temperature and input from the sensor, in order to temperature compensate, linearize, and amplify the transducer output. A linear fit of the programmed DAC adjustment values can be performed by a simple program stored in micro-controller 124. Furthermore, any suitable type of fit, such as a polynomial fit or spline fit, could be programmed into micro-controller 124, as known in the art.

Figure 3:
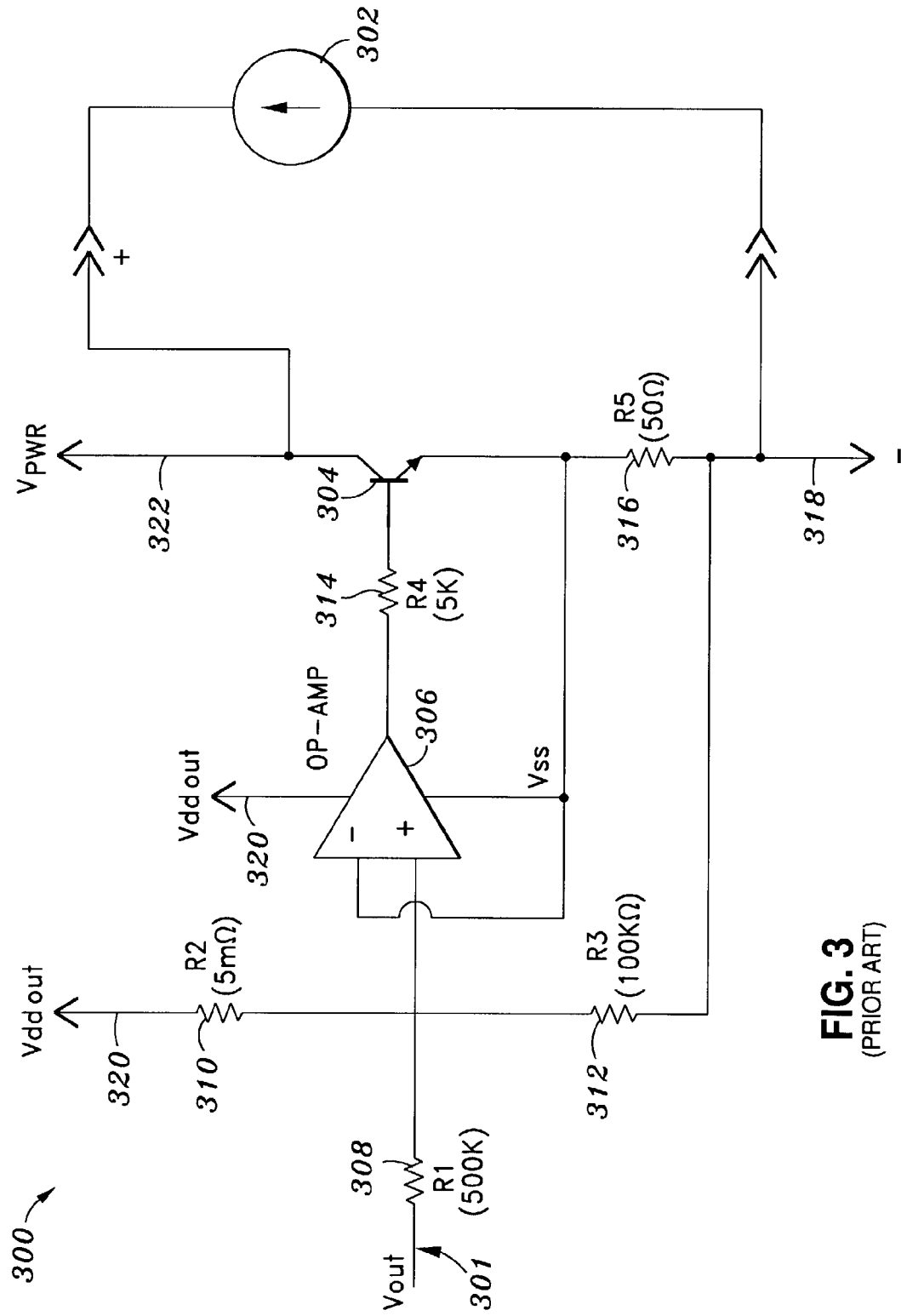
FIG. 3 is an example circuit diagram for converting a voltage signal to a current signal according to the prior art.

Referring now to FIG. 3, an example circuit 300 for converting a voltage signal output to a current signal output, as known in the art, is shown. Input 301 of circuit 300 may be connected, for example, to the output 110 of sensor signal conditioner 100. Circuit 300 may convert the voltage output 110 signal of sensor signal conditioner 100 to a current output signal 302 through output transistor 304. Circuit 300 may be implemented, for example, on the same ASIC chip as sensor signal conditioner 100. Output 110 signal voltage may typically be in the range of about 0–5 Volts, and output signal current 302 may typically be in the range of about 4–20 milli-Amperes (mA).

Circuit 300 may comprise an operational amplifier (op amp) 306 connected, as known in the art and shown in FIG. 3, to amplify output 110 signal voltage at input 301 of circuit 300 to drive transistor 304 as a current source to supply output signal current 302, using resistors 308, 310, 312, 314, and 316 to provide, for example, biasing, signal connections, and impedance matching, as known in the art. For example, resistor 308 may have a value of 500,000 ohms (written as 500 KΩ), resistor 310 may have a value of 5 million ohms (written as 5 MΩ), resistor 312 may have a value of 100 KΩ, resistor 314 may have a value of 5 KΩ, and resistor 316 may have a value of 50Ω. Circuit 300 may be connected to a negative terminal of a power supply, or common ground of an ASIC chip, at point 318 in circuit 300. Circuit 300 may be connected to a positive source of regulated voltage, Vddout 320, as shown in FIG. 3. Vddout 320 may be supplied, for example, from a voltage regulating circuit implemented on the same ASIC chip on which circuit 300 and sensor signal conditioner 100 may be implemented. Circuit 300 may be connected to a positive source of voltage, VPWR 322, which may be supplied from an external power supply. Typical values for Vddout 320 and VPWR 322 are in the range of 5–10 Volts, as known in the art.

It should be understood, of course, that the foregoing relates to preferred embodiments of the invention and that modifications may be made without departing from the spirit and scope of the invention as set forth in the following claims.

We claim:

1. A system comprising: a programmable gain instrument amplifier having an input connected to a sensor; a comparator for comparing an amplifier output voltage of said programmable gain instrument amplifier to a desired output voltage value and providing a difference; a micro-controller for providing a gain and an offset based on said difference; a temperature sensor for measuring a temperature of said sensor; an analog-to-digital converter for providing at least three different physical measurements from said temperature sensor to said micro-controller; a first digital-to-analog converter for providing said gain to said programmable gain instrument amplifier; a second digital-to-analog converter for providing said offset to said programmable gain instrument amplifier; and a memory for storing a programming protocol and a plurality of programmed DAC adjustment values whereby trim values for temperature compensating, linearizing, and amplifying an amplifier output of said programmable gain instrument amplifier may be produced.

2. The system of claim 1 further comprising:
an I/O pin;
a mode switch for connecting said I/O pin to an input to said comparator for inputting said desired output voltage value in a programming mode and for connecting said I/O pin to said amplifier output in a user mode; and
a user/programming mode pin for controlling said mode switch.

3. The system of claim 1 further comprising a step indicator for indicating the currently processed step of said programming protocol.

4. The system of claim 1 further comprising:
a first high resolution digital-to-analog converter for providing a fine gain to said programmable gain instrument amplifier; and
a second high resolution digital-to-analog converter for providing a fine offset to said programmable gain instrument amplifier.

5. The system of claim 1 further comprising a program set pin and wherein said memory is an EPROM, said EPROM being programmable within five seconds after a high voltage is applied to said program set pin.

6. The system of claim 1 further comprising:
an analog-to-digital converter for providing a temperature input from said temperature sensor to said micro-controller.

7. The system of claim 1 further comprising an analog-to-digital converter for providing a digital value of said amplifier output voltage to said micro-controller.

8. The system of claim 1 wherein said programmable gain instrumentation amplifier is a differential amplifier.

9. The system of claim 1 further comprising a circuit that converts said amplifier output voltage of said programmable gain instrument amplifier to a current output signal.

10. An ASIC chip circuit for temperature compensating, linearizing, and amplifying a transducer signal output for electronic instrumentation, comprising:
a programmable gain instrument amplifier having an input for receiving a signal from a sensor;
a comparator for comparing an amplifier output voltage of said programmable gain instrument amplifier to a desired output voltage value and providing a difference;
a micro-controller for providing a gain and an offset based on said difference;
a temperature sensor for measuring a temperature of said sensor;
an analog-to-digital converter for providing at least three different physical measurements from said temperature sensor to said micro-controller;
a first digital-to-analog converter for providing said gain to said programmable gain instrument amplifier;
a second digital-to-analog converter for providing said offset to said programmable gain instrument amplifier;
an I/O pin;
a mode switch for connecting said I/O pin to an input of said comparator for inputting said desired output voltage value in a programming mode and for connecting said I/O pin to said amplifier output in a user mode;
a user/programming mode pin for controlling said mode switch; and
a memory for storing a programming protocol and a plurality of programmed DAC adjustment values whereby, in said programming mode, said programming protocol is per-formed to store said plurality of programmed DAC adjustment values and, in said user mode, linearly fit said programmed DAC adjustment values to set trim values for temperature compensating and linearizing an amplifier output of said programmable gain instrument amplifier.

11. The ASIC chip circuit of claim 10 further comprising a step indicator for indicating the currently processed step of said programming protocol.

12. The ASIC chip circuit of claim 10 further comprising:
a first high resolution digital-to-analog converter for providing a fine gain to said programmable gain instrument amplifier; and
a second high resolution digital-to-analog converter for providing a fine offset to said programmable gain instrument amplifier.

13. The ASIC chip circuit of claim 10 further comprising a program set pin and wherein said memory is an EPROM, said EPROM being programmable within five seconds after a high voltage is applied to said program set pin.

14. The ASIC chip circuit of claim 10 further comprising an analog-to-digital converter for providing a digital value of said amplifier output voltage to said micro-controller.

15. The ASIC chip circuit of claim 10 further comprising an operational amplifier.

16. The ASIC chip circuit of claim 10 further comprising a circuit that converts said amplifier output voltage of said programmable gain instrument amplifier to a current output signal.

17. A mass-produced, temperature compensated, linearized, and amplified transducer comprising:
a programmable gain instrument amplifier having an input connected to a sensor;
a comparator for comparing an amplifier output voltage of said programmable gain instrument amplifier to a desired output voltage value and providing a difference;
a micro-controller for providing a gain and an offset based on said difference;
a temperature sensor for measuring a temperature of said sensor;
an analog-to-digital converter for providing at least three different physical measurements from said temperature sensor to said micro-controller;
a first digital-to-analog converter for providing said gain to said programmable gain instrument amplifier;
a second digital-to-analog converter for providing said offset to said programmable gain instrument amplifier;
an I/O pin for providing connection to a voltage generator simultaneously with a second transducer;
a mode switch for connecting said I/O pin to an input of said comparator for inputting said desired output voltage value in a programming mode and for connecting said I/O pin to said amplifier output in a user mode;
a user/programming mode pin for controlling said mode switch;
a memory for storing a programming protocol and a plurality of programmed DAC adjustment values; and
a step indicator for indicating the currently processed step of said programming protocol whereby, in said programming mode, said programming protocol is performed while said second transducer is connected at said I/O pin and said programming protocol is performed to store said plurality of programmed DAC adjustment values and, in said user mode, linearly fit said programmed DAC adjustment values to set trim values for temperature compensating and linearizing an amplifier output of said programmable gain instrument amplifier.

18. The transducer of claim 17 further comprising:
a first high resolution digital-to-analog converter for providing a fine gain to said programmable gain instrument amplifier; and
a second high resolution digital-to-analog converter for providing a fine offset to said programmable gain instrument amplifier.

19. The transducer of claim 17 further comprising a program set pin and wherein said memory is an EPROM, said EPROM being programmable within five seconds after a high voltage is applied to said program set pin.

20. The transducer of claim 17 further comprising an analog-to-digital converter for providing a digital value of said amplifier output voltage to said micro-controller.

21. The transducer of claim 17 further comprising a circuit that converts said amplifier output voltage of said programmable gain instrument amplifier to a current signal output.

22. An electronic instrumentation circuit for temperature compensating, linearizing, and amplifying a sensor signal output, comprising:
a programmable gain instrument amplifier having an input connected to a sensor;
a comparator for comparing an amplifier output voltage of said programmable gain instrument amplifier to a desired output voltage value and providing a difference;
a micro-controller for providing a gain and an offset based on said difference;
a temperature sensor for measuring a temperature of said sensor;
a first analog-to-digital converter for providing at least three different physical measurements from said temperature sensor to said micro-controller;
a second analog-to-digital converter for providing a digital value of said amplifier output voltage to said micro-controller;
a first digital-to-analog converter for providing said gain to said programmable gain instrument amplifier;
a second digital-to-analog converter for providing said offset to said programmable gain instrument amplifier;
a high resolution digital-to-analog converter for providing a fine gain to said programmable gain instrument amplifier;
a high resolution digital-to-analog converter for providing a fine offset to said programmable gain instrument amplifier;
an I/O pin;
a mode switch for connecting said I/O pin to an input of said comparator for inputting said desired output voltage value in a programming mode and for connecting said I/O pin to said amplifier output in a user mode;
a user/programming mode pin for controlling said mode switch;
a program set pin;
a memory for storing a programming protocol wherein said memory is an EPROM, said EPROM being programmable within five seconds after a high voltage is applied to said program set pin; and
a step indicator for indicating the currently processed step of said programming protocol whereby, in said programming mode, said programming protocol is performed to store a plurality of programmed DAC adjustment values and, in said user mode, linearly fit said programmed DAC adjustment values to set trim values for temperature compensating, and linearizing an amplifier output of said programmable gain instrument amplifier.

23. A method for temperature compensating, linearizing, and amplifying sensor signal output, comprising steps of:
applying a signal for a sensor signal conditioner to enter a programming mode;
connecting a programmable, precision voltage source to said sensor signal conditioner;
setting a temperature for a sensor connected to said sensor signal conditioner;
taking at least three different physical measurements from said sensor at said temperature;
storing a plurality of programmed DAC adjustment values into a memory in said sensor signal conditioner;

repeating said setting, taking, and storing steps for at least a second different temperature;

applying an appropriate signal for said sensor signal conditioner to enter a user mode; and linearly fitting said plurality of programmed DAC adjustment values in said signal sensor conditioner.

24. The method of claim 23 further comprising a step, after entering said programming mode, of converting an I/O pin to input a desired voltage value from said programmable, precision voltage source.

25. The method of claim 23 further comprising a step of simultaneously connecting a second signal sensor conditioner to said programmable, precision voltage source.

26. The method of claim 23 wherein said taking step comprises comparing an amplifier output voltage of said sensor signal conditioner to a desired voltage value from said programmable, precision voltage source.

27. The method of claim 23 wherein said storing step comprises placing a high voltage on a program set pin for five seconds to store one of said plurality of programmed values into an EPROM.

28. The method of claim 23 further comprising a step of providing a step indicator for a programming protocol in said sensor signal conditioner.

* * * * *